(12) United States Patent
Shibata

(10) Patent No.: US 12,358,475 B2
(45) Date of Patent: Jul. 15, 2025

(54) VEHICLE BRAKING DEVICE

(71) Applicant: DENSO CORPORATION, Kariya (JP)

(72) Inventor: Yusuke Shibata, Kariya (JP)

(73) Assignee: DENSO CORPORATION, Kariya (JP)

( * ) Notice: Subject to any disclaimer, the term of this patent is extended or adjusted under 35 U.S.C. 154(b) by 147 days.

(21) Appl. No.: 18/454,689

(22) Filed: Aug. 23, 2023

(65) Prior Publication Data

US 2023/0398967 A1 Dec. 14, 2023

Related U.S. Application Data

(63) Continuation of application No. PCT/JP2022/005231, filed on Feb. 10, 2022.

(30) Foreign Application Priority Data

Feb. 25, 2021 (JP) .................... 2021-028646

(51) Int. Cl.
*B60T 8/172* (2006.01)
*B60T 13/74* (2006.01)
*B60T 17/22* (2006.01)

(52) U.S. Cl.
CPC .............. *B60T 8/172* (2013.01); *B60T 13/74* (2013.01); *B60T 17/22* (2013.01); *B60T 2250/04* (2013.01)

(58) Field of Classification Search
CPC ...... B60T 13/74; B60T 17/22; B60T 2250/04; B60T 8/17; B60T 8/172; B60T 8/28
See application file for complete search history.

(56) References Cited

U.S. PATENT DOCUMENTS

| | | | |
|---|---|---|---|
| 6,199,670 B1* | 3/2001 | Shirai | B60T 13/74 188/162 |
| 9,168,818 B2* | 10/2015 | Hirai | B60K 17/356 |
| 10,384,659 B2* | 8/2019 | Masuda | H02P 15/00 |
| 10,759,399 B2* | 9/2020 | Masuda | B60T 1/065 |
| 11,420,604 B2* | 8/2022 | Masuda | B60T 13/74 |
| 12,139,122 B2* | 11/2024 | Matsuzaki | B60T 8/172 |
| 2003/0090227 A1* | 5/2003 | Ito | B25B 23/1405 318/434 |
| 2008/0048596 A1* | 2/2008 | Konishi | B60T 13/741 188/158 |
| 2017/0072931 A1* | 3/2017 | Masuda | F16D 55/226 |
| 2018/0099651 A1* | 4/2018 | Yogo | B60T 8/171 |
| 2018/0154873 A1* | 6/2018 | Masuda | F16D 66/00 |

(Continued)

*Primary Examiner* — Carl C Staubach
(74) *Attorney, Agent, or Firm* — Maschoff Brennan

(57) ABSTRACT

A vehicle braking device has electric brakes for generating a braking force at corresponding wheels. The vehicle braking device includes a braking force controller for controlling the braking force. A relationship between an electric current and the braking force in each of the electric brakes has a hysteresis characteristic. The hysteresis characteristic indicates that the braking force increases along a positive efficiency line when the electric current increases, the braking force is held constant when the electric current decreases from a turning value to a holding threshold, and the braking force decreases along an inverse efficiency line when the electric current decreases from the holding threshold. The braking force controller alternately switches between a positive efficiency braking wheel and the braking force holding wheel while a required braking force of the vehicle increases or is held.

9 Claims, 9 Drawing Sheets

(56) References Cited

U.S. PATENT DOCUMENTS

| | | | |
|---|---|---|---|
| 2019/0152451 A1* | 5/2019 | Nakaoka | B60T 13/662 |
| 2020/0108807 A1* | 4/2020 | Ohkubo | F16D 65/183 |
| 2024/0166178 A1* | 5/2024 | Kikawa | B60T 13/588 |
| 2024/0250624 A1* | 7/2024 | Shibata | H02P 3/18 |
| 2024/0317201 A1* | 9/2024 | Shibata | B60T 13/741 |
| 2024/0322725 A1* | 9/2024 | Shibata | H02P 21/12 |

* cited by examiner

VEHICLE BRAKING DEVICE

CROSS REFERENCE TO RELATED APPLICATIONS

The present application is a continuation application of International Patent Application No. PCT/JP2022/005231 filed on Feb. 10, 2022, which designated the U.S. and claims the benefit of priority from Japanese Patent Application No. 2021-028646 filed on Feb. 25, 2021. The entire disclosures of all of the above applications are incorporated herein by reference.

TECHNICAL FIELD

The present disclosure relates to a vehicle braking device.

BACKGROUND

A technique related to an electric brake device for a vehicle for reducing power consumption during braking has been known.

SUMMARY

According to at least one embodiment, a vehicle braking device to be mounted on a vehicle has electric brakes for generating a braking force at corresponding wheels. The vehicle braking device includes a braking force controller for controlling the braking force generated by each of the electric brakes. A relationship between an electric current and the braking force in each of the electric brakes has a hysteresis characteristic. The hysteresis characteristic indicates that the braking force increases along a positive efficiency line when the electric current increases, the braking force is held constant when the electric current decreases from a turning value, at which the electric current changes from an increase to a decrease, to a holding threshold, and the braking force decreases along an inverse efficiency line when the electric current decreases from the holding threshold.

A section in which the braking force is held constant when the electric current decreases from the turning value to the holding threshold is a braking force holding section. A wheel corresponding to each of the electric brakes in which the braking force increases along the positive efficiency line is a positive efficiency braking wheel. A wheel corresponding to each of the electric brakes operating in the braking force holding section is a braking force holding wheel. The braking force controller alternately switches between the positive efficiency braking wheel and the braking force holding wheel while a required braking force of the vehicle increases or is held, except when the vehicle satisfies a predetermined application exclusion requirement.

BRIEF DESCRIPTION OF DRAWINGS

The details of one or more embodiments are set forth in the accompanying drawings and the description below. Other features and advantages will be apparent from the description and drawings, and from the claims. In the drawings.

DETAILED DESCRIPTION

Figure 1:
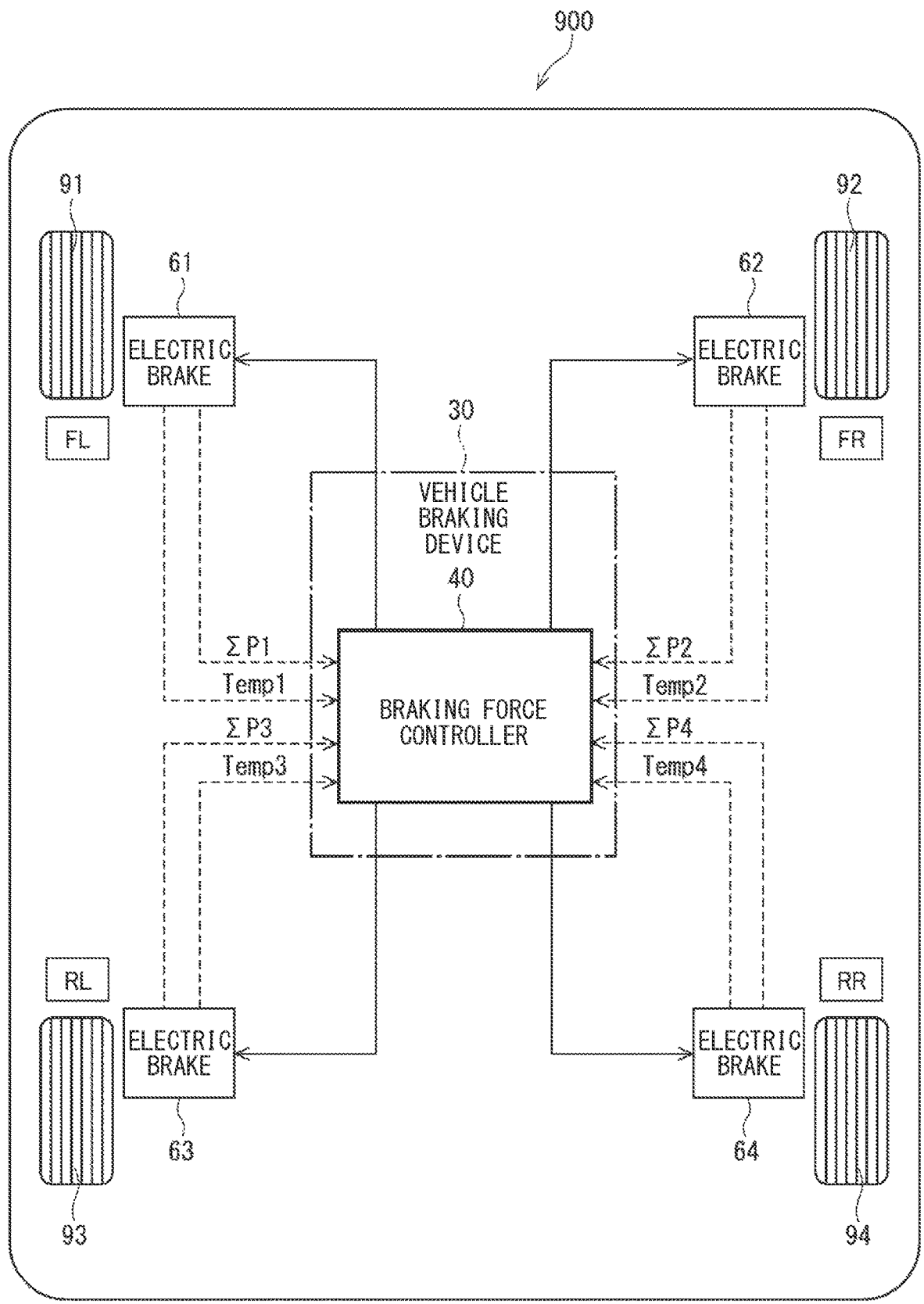
FIG. 1 is a diagram illustrating a configuration of a vehicle with which a vehicle braking device of the present embodiment is equipped.

To begin with, examples of relevant techniques will be described.

According to an example, an electric brake device for a vehicle is capable of reducing power consumption during braking. For example, an electric brake device according to an example performs braking by converting an output of a motor into a pressing force. The pressing force is increased by a positive efficiency operation when motor torque is increased. The pressing force does not change until the pressing force becomes equal to or less than a predetermined torque when the motor torque is decreased. That is, the motor torque has hysteresis characteristics. According to an example, the electric brake device may reduce an electric current of the motor by limiting a ratio of time of the positive efficiency operation within a predetermined time to a predetermined value or less.

In the electric brake device of an example, the positive efficiency operation of increasing the braking force and an operation of reducing the electric current while maintaining the braking force may be uniformly switched for a plurality of wheels. In this case, a change in the braking force in an entire vehicle may become less smooth, and brake feeling of a driver may be deteriorated.

According to one aspect of the present disclosure, a vehicle braking device to be mounted on a vehicle has electric brakes for generating a braking force at corresponding wheels. The vehicle braking device includes a braking force controller for controlling the braking force generated by each of the electric brakes. A relationship between an electric current and the braking force in each of the electric brakes has a hysteresis characteristic. The hysteresis characteristic indicates that the braking force increases along a positive efficiency line when the electric current increases, the braking force is held constant when the electric current decreases from a turning value, at which the electric current changes from an increase to a decrease, to a holding threshold, and the braking force decreases along an inverse efficiency line when the electric current decreases from the holding threshold.

A section in which the braking force is held constant when the electric current decreases from the turning value to the holding threshold is a braking force holding section. A wheel corresponding to each of the electric brakes in which the braking force increases along the positive efficiency line is a positive efficiency braking wheel. A wheel corresponding to each of the electric brakes operating in the braking force holding section is a braking force holding wheel. The braking force controller alternately switches between the positive efficiency braking wheel and the braking force holding wheel while a required braking force of the vehicle increases or is held, except when the vehicle satisfies a predetermined application exclusion requirement.

According to this configuration, since the electric brakes operate in the braking force holding section at timings shifted from each other, it is possible to reduce the electric current of the electric brake while keeping the braking force change smooth in the entire vehicle. Therefore, it is possible to realize good brake feeling and economic efficiency.

Preferably, except when the vehicle satisfies the application exclusion requirement, the braking force controller controls energization of each electric brake so that any one or more wheels always become the positive efficiency braking wheels and the other one or more wheels become the braking force holding wheels while the required braking force of the vehicle is increased or held.

Hereinafter, a vehicle braking device according to an embodiment of the present disclosure will be described with reference to the drawings. The vehicle braking device of the present embodiment is equipped to a vehicle in which electric brakes that generate braking forces on corresponding wheels are provided on each of the wheels. The vehicle braking device includes a braking force controller that controls a braking force generated by each of the electric brakes. The following first to fourth embodiments are collectively referred to as "present embodiment". In the first to fourth embodiments, a configuration of a vehicle braking device is the same, and a processing by the braking force controller is different.

First Embodiment

Common matters of the respective embodiments and the first embodiment will be described with reference to FIGS. 1 to 7. First, with reference to FIG. 1, a configuration of a vehicle 900 to which a vehicle braking device 30 is equipped will be described. The vehicle 900 is a four-wheel vehicle having two rows of left and right pairs of wheels 91, 92, 93, 94 in a front-rear direction. In the present specification, the wheels 91, 92 are also referred to as front row left and right wheels FL, FR. The wheels 93, 94 are also referred to as rear row left and right wheels RL, RR.

Electric brakes 61, 62, 63, 64, in this example is four, are provided corresponding to each of the wheels 91, 92, 93, 94. Hereinafter, four consecutive reference numerals will be appropriately abbreviated to "wheels 91 to 94" and "electric brakes 61 to 64". The same applies to the symbols "integrated power value ΣP1 to ΣP4" and "temperature Temp1 to Temp4" described later.

Each of the electric brakes 61 to 64 generates a braking force on each of the corresponding wheels 91 to 94 by pressing a friction pad against a brake rotor by a positive operation of an electric actuator including a motor or the like. The braking force is reduced to zero when the friction pad is separated from the brake rotor by an operation of the electric actuator. Since this mechanical structure of the electric brakes 61 to 64 is a well-known technique, a detailed description thereof will be omitted.

The vehicle braking device 30 includes a braking force controller 40. The braking force controller 40 controls the braking force generated by each of electric brakes 61 to 64 on the corresponding wheels 91 to 94. More specifically, the braking force controller 40 individually controls an electric current to be supplied to each of the electric brakes 61 to 64 and a supply timing of the electric current.

As indicated by broken lines in FIG. 1, the braking force controller 40 may acquire at least one of integrated power values ΣP1 to ΣP4 of the electric brakes 61-64 and electric brake temperatures Temp1 to Temp4. The electric brake temperatures Temp1 to Temp4 are detected by, for example, a temperature sensor. Alternatively, in a case where influence of an outside air temperature, an exhaust heat of the vehicle, and the like is the same in each of the electric brakes 61 to 64 and the electric brake temperatures mainly depend on the Joule heat by energization, the braking force controller 40 may calculate the electric brake temperatures Temp1 to Temp4 by estimating a temperature rise from the integrated power values UP to ΣP4 and adding the temperature rise to the outside air temperature. In this case, the integrated power values ΣP1 to ΣP4 of each of the electric brakes 61 to 64 and the temperatures Temp1 to Temp4 have a positive correlation.

The integrated power values ΣP1 to ΣP4 and the electric brake temperatures Temp1 to Temp4 are referred to in the fourth embodiment. The electric brake temperatures Temp1 to Temp4 are also mentioned in descriptions of an application exclusion requirement with reference to FIG. 6. In an embodiment other than the fourth embodiment or in a case where a determination of the application exclusion requirement based on the electric brake temperature is not performed, the braking force controller 40 may not acquire the integrated power values ΣP1 to ΣP4 or the electric brake temperatures Temp1 to Temp4.

Figure 2:
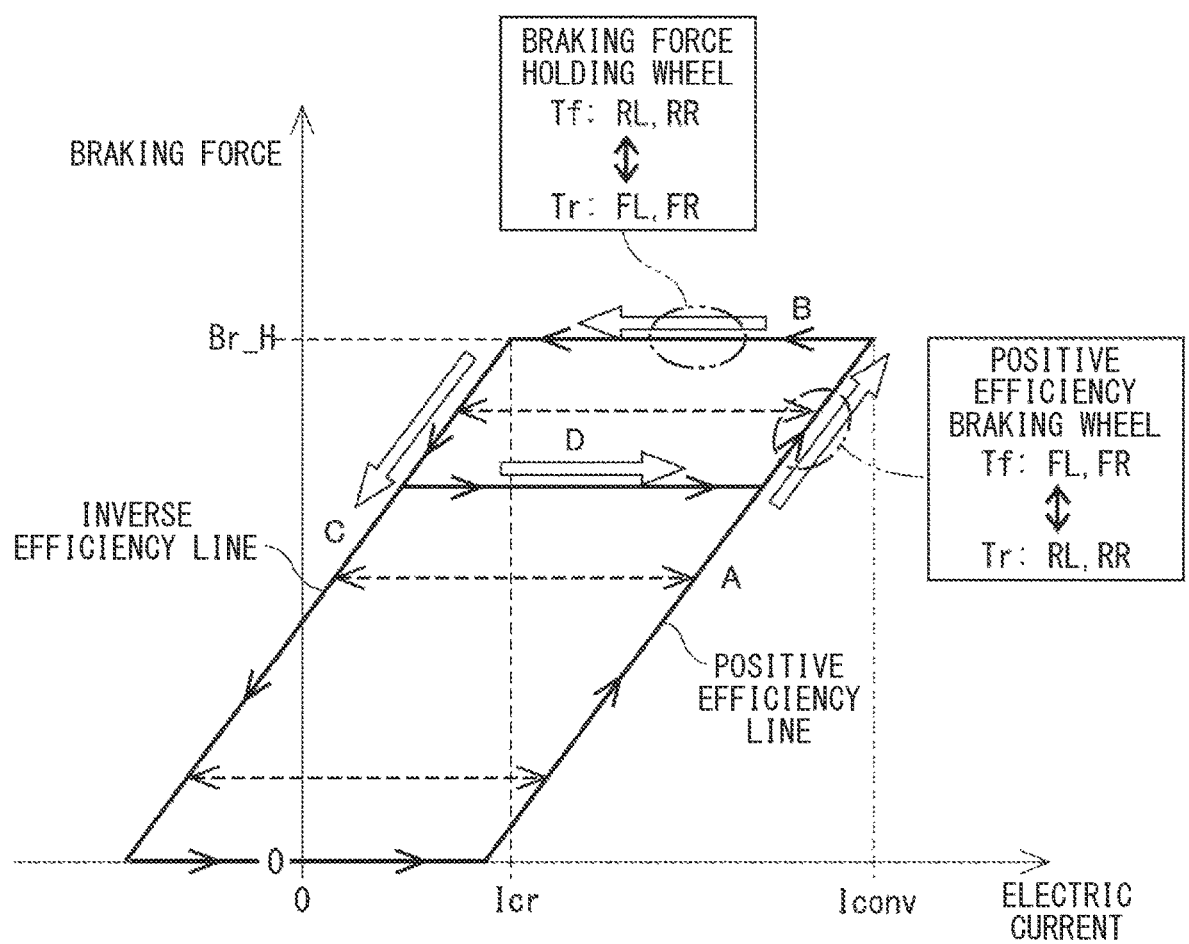
FIG. 2 is a diagram illustrating hysteresis characteristics between an electric current and a braking force of an electric brake.

Next, a relationship between the electric current supplied to the electric brakes 61 to 64 and the braking force will be described with reference to FIG. 2. As shown in FIG. 2, the relationship between the electric current of the electric brakes 61 to 64 and the braking force has hysteresis characteristics. In FIG. 2, since the actuator of the electric brake is not limited to the motor, a horizontal axis is not described as torque and is described as "electric current". For example, the actuator may use an electric linear actuator as an actuator of an electric brake. A vertical axis is not specifically described as the pressing force of the friction pad and is described as "braking force" in FIG. 2.

Arrows in FIG. 2 indicate a direction of the hysteresis. The braking force increases along a positive efficiency line when the electric current increases in a section A. The section A in which the braking force increases is defined as a "braking force increase section". A value at which the electric current changes from an increase to a decrease is referred to as a "turning value Iconv". A process of decreasing the electric current is divided into two sections B, C. The braking force is kept at a holding braking force Br_H when the electric current decreases from the turning value Iconv to a holding threshold Icr in the section B. The section B in which the braking force is kept constant is defined as a "braking force holding section". The braking force decreases along an inverse efficiency line when the electric current decreases from the holding threshold Icr in the section C. The section C in which the braking force decreases is defined as a "braking force decrease section".

When the electric current changes from a decrease to an increase, as indicated by an arrow D, the braking force maintains the braking force at that time and then shifts to the braking force increase section A. In addition, the turning value Iconv and the holding braking force Br_H are not fixed values, but change each time according to an increase or decrease in the electric current. That is, as indicated by broken lines arrow in FIG. 2, each time the electric current alternates between an increase and a decrease, the electric current alternates between the positive efficiency line and the inverse efficiency line on a constant braking force line.

In the braking force increase section, power consumption is large, and in the braking force decrease section, the power consumption is small. In the braking force holding section, the electric current can be reduced while holding the braking force by using frictional force. Electric brakes of an example corresponding to all the wheels are uniformly divided into a period in which the electric brakes are operated in the braking force increase section and a period in which the electric brakes are operated in the braking force holding section, and a time ratio of a period in which the electric brakes are operated in the braking force increase section is limited to a predetermined value or less. However, in the example, a period in which the braking force is increased and a period in which the braking force is held are intermittently repeated, and a deceleration of the vehicle also changes in a stepwise manner along with the repetition of the period, so that brake feelings of a driver may deteriorate.

Therefore, an object of the present embodiment is to reduce the electric current of the electric brakes 61 to 64 while keeping a change of the braking force smooth in the vehicle. For this reason, the braking force controller 40 alternately switches distribution of the braking force to each wheels 91 to 94 so that a period in which the electric brakes 61 to 64 corresponding to each wheels 91 to 94 is operated in the braking force increase section and a period in which the electric brake is operated in the braking force holding section are shifted from each other. Hereinafter, this processing according to the present embodiment is referred to as a "braking force alternate distribution processing".

A direct control target of the braking force controller 40 is the electric brakes 61 to 64, switching of the braking force distribution is more easily described using the corresponding wheels 91 to 94. Therefore, a "wheel corresponding to the electric brake in which the braking force increases along the positive efficiency line" is defined as a "positive efficiency braking wheel", and a "wheel corresponding to the electric brake operating in the braking force holding section" is defined as a "braking force holding wheel".

In principle, the braking force controller 40 alternately switches between the positive efficiency braking wheel and the braking force holding wheel while required braking force of the vehicle is increased or held. More specifically, for example, a front row force increasing period Tf and a rear row force increasing period Tr are alternately repeated while the required braking force of the vehicle is increased or held. In the front row force increasing period Tf, the front row left and right wheels FL, FR serve as positive efficiency braking wheels, and the rear row left and right wheels RL, RR serve as braking force holding wheels. In the rear row force increasing period Tr, the rear row left and right wheels RL, RR serve as positive efficiency braking wheels, and the front row left and right wheels FL, FR serve as braking force holding wheels. Details of operations of this example will be described later with reference to FIGS. 3 and 4. In principle, the braking force controller 40 alternately switches the positive efficiency braking wheel and the braking force holding wheel, but does not alternately switch the positive efficiency braking wheel and the braking force holding wheel, except when the vehicle satisfies a predetermined application exclusion requirement. The application exclusion requirement will be described later with reference to FIGS. 5 and 6.

Next, with reference to FIGS. 3 and 4, as the braking force alternate distribution processing of the first embodiment, a basic operation will be described using a simple model in which the braking force linearly changes with time. For simplicity, it is assumed that the front row left and right wheels FL, FR and the rear row left and right wheels RL, RR in the four-wheel vehicle are controlled under the same conditions, and the positive efficiency braking wheels and the braking force holding wheels are alternately switched between the front row and the rear row. In a configuration in which the left and right wheels of each row are individually controlled, the positive efficiency braking wheel and the braking force holding wheel are alternately switched among the four wheels FL, FR, RL, RR.

Figure 3:
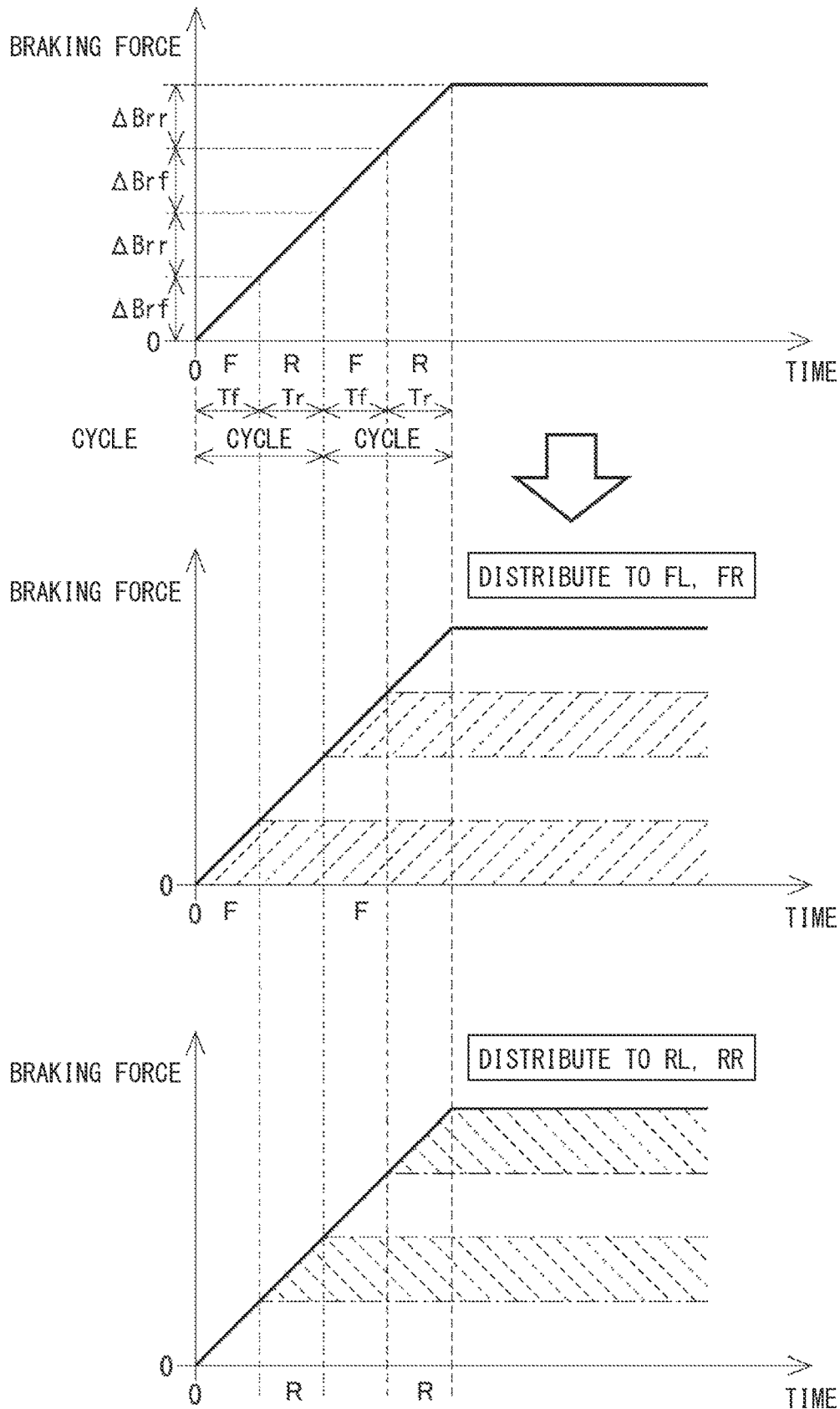
FIG. 3 is a time chart illustrating an alternate distribution process of the braking force according to a first embodiment.

In FIG. 3, a character "F" on a time axis indicates that the positive efficiency braking wheels are the front row left and right wheels FL, FR, and an operation period thereof is referred to as a front row force increasing period "Tr". In the front row force increasing period Tf, the rear row left and right wheels RL, RR serve as the braking force holding wheels. A character "R" on the time axis indicates that the positive efficiency braking wheels are the rear row left and right wheels RL, RR, and an operation period thereof is referred to as a rear row force increasing period "Tr". In the rear row force increasing period Tr, the front row left and right wheels FL, FR serve as the braking force holding wheels.

In addition, a braking force change width in the front row force increasing period Tf is referred to as ΔBrf, and a braking force change width in the rear row force increasing period Tr is referred to as ΔBrr. The braking force change width is proportional to a length of a force increasing period when the braking force linearly changes with time. That is, a ratio between the front row force increasing period Tf and the rear row force increasing period Tr matches a ratio between the braking force change width ΔBrf of the front row and the braking force change width ΔBrr of the rear row.

In FIG. 3, solid lines represent the braking force obtained from a deceleration target of the vehicle. As illustrated in the upper part in FIG. 3, the braking force distribution is switched at a timing at which one set of the front-row force increasing period Tf and the rear-row force increasing period Tr is a fixed cycle. As described above, the braking force controller 40 of the first embodiment alternately switches between the positive efficiency braking wheels and the braking force holding wheels at the fixed cycle. In this way, the braking force controller 40 controls the energization of each of the electric brakes 61 to 64 so that one or more wheels always serve as the positive efficiency braking wheels and one or more other wheels serve as the braking force holding wheels while the required braking force of the vehicle is increased or held.

Figure 4:
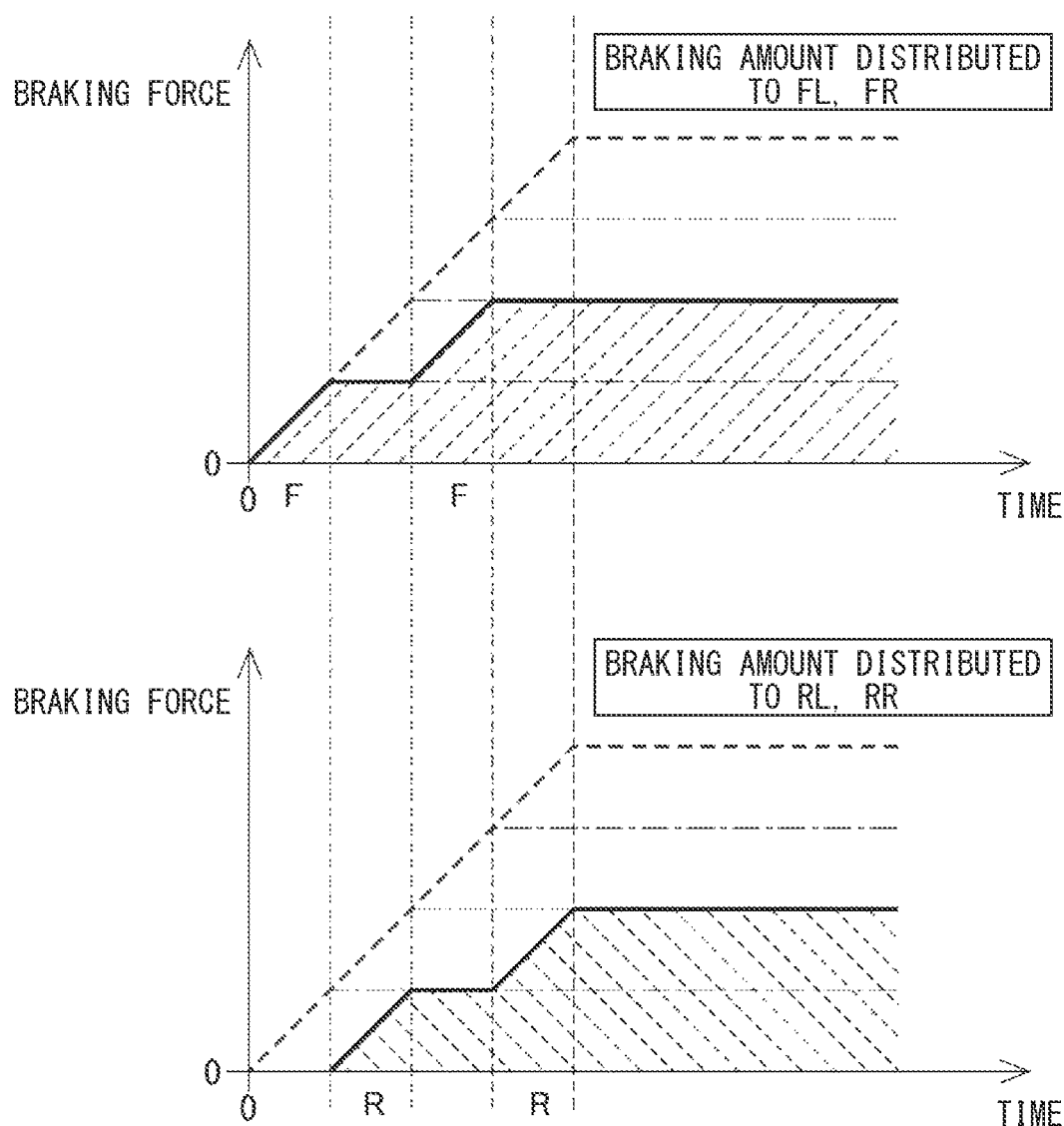
FIG. 4 is a diagram illustrating braking amounts distributed to wheels of a front row and a rear row.

In FIGS. 3 and 4, the front row force increasing period Tf and the rear row force increasing period Tr are illustrated to have the same length, but the front row force increasing period Tf and the rear row force increasing period Tr may be set to different values. The force increasing period may be set to a different value for each wheels 91 to 94 when the positive efficiency braking wheels and the braking force holding wheels are alternately switched between the four wheels FL, FR, RL, RR. That is, the force increasing period, which is a numerical value used by the braking force controller 40 to determine switching between the positive efficiency braking wheels and the braking force holding wheels, may be set to a different value for each wheels 91 to 94 according to vehicle behavior or the like.

Alternatively, focusing on a vertical axis of FIG. 3, it is also interpreted that the braking force distribution is switched at a timing when each of the braking force change widths ΔBrf and ΔBrr reaches a predetermined value. That is, the braking force controller 40 of the first embodiment can be interpreted as alternately switching the positive efficiency braking wheels and the braking force holding wheels based on a variation width of the braking force. Also in this case, the variation width of the braking force, which is a numerical value used by the braking force controller 40 to determine the switching between the positive efficiency braking wheels and the braking force holding wheels, may be set to a different value for each wheels 91 to 94 according to the vehicle behavior or the like.

In the middle part of FIG. 3, a region in which the braking force is distributed to the front row left and right wheels FL, FR as the positive efficiency braking wheels is indicated by broken line hatching. In the lower part of FIG. 3, a region in which the braking force is distributed to the rear row left and right wheels RL, RR as the positive efficiency braking wheels is indicated by the broken line hatching. In the middle and lower parts of FIG. 3, the braking forces distributed to the front and rear rows are collectively shown as shown in FIG. 4. An area of the broken line hatching corresponds to a braking amount distributed to the wheels in the front row and the rear row.

Figure 5:
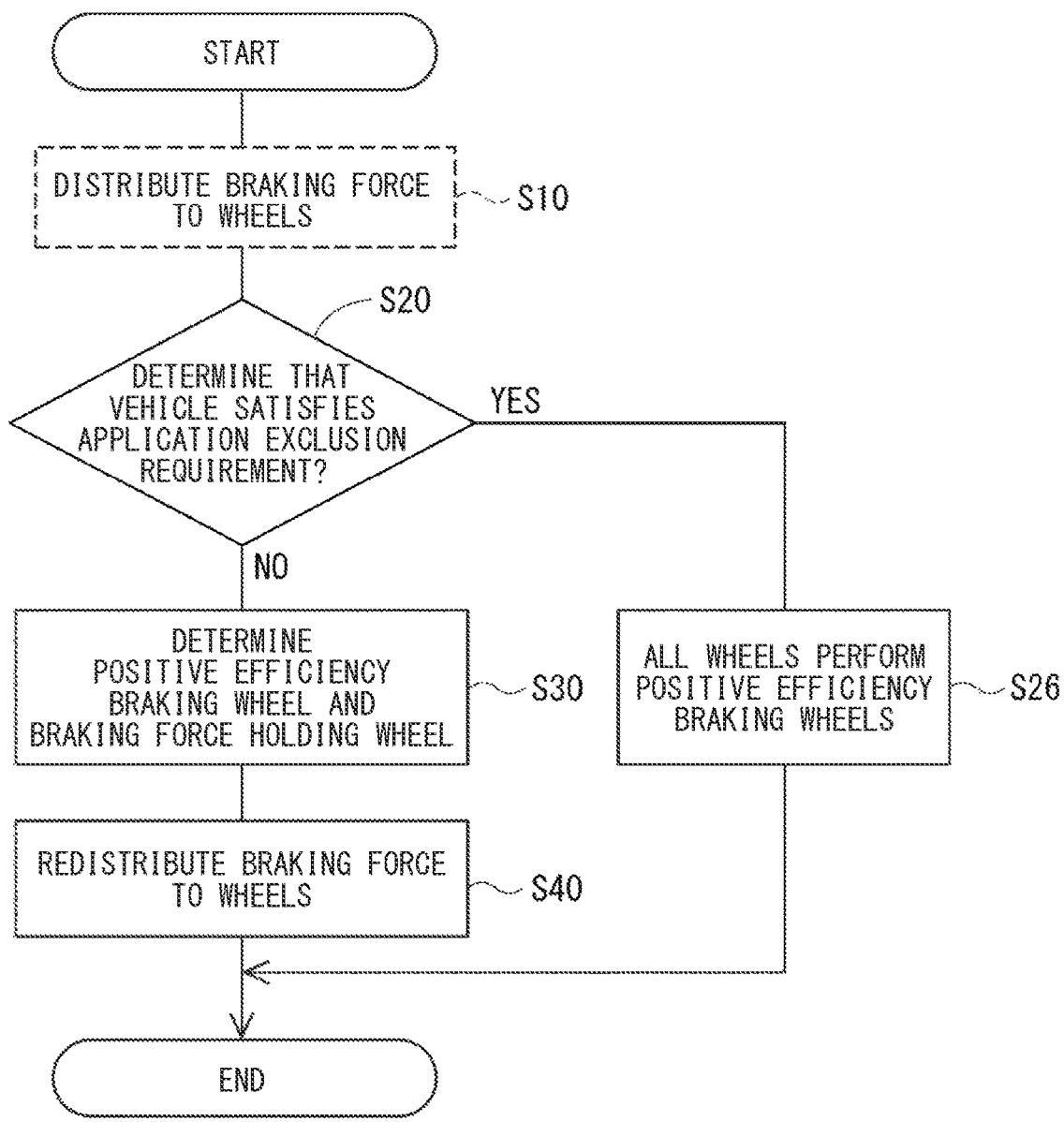
FIG. 5 is a flowchart of a braking force distribution.

Next, refer to a flowchart shown in FIG. 5. In the following flowchart, a symbol S indicates a step. Step S10 indicated by a broken line is an optional step, and may not be executed. When executing step S10, the braking force controller 40 distributes the braking force to each wheels 91 to 94 at the beginning of a routine.

In step S20, it is determined whether the vehicle 900 satisfies the application exclusion requirement. In a situation in which priority is given to other actions and effects over electric current reduction, a situation in which an effect of smoothing a change in braking force in the vehicle is small, or the like, it may be better not to provide the braking force holding wheel and to use all of the wheels 91 to 94 as the positive efficiency braking wheels. A requirement for determining such a case is defined as the application exclusion requirement. A specific example of the application exclusion requirement will be described later with reference to FIG. 6. In a case of YES in step S20, the braking force controller 40 controls energization of each of the electric brakes 61 to 64 in step S26 so that all the wheels 91 to 94 perform the positive efficiency braking wheels.

In a case of NO in step S20, the braking force controller 40 determines the positive efficiency braking wheel and the braking force holding wheel in step S30. In step S40, the braking force controller 40 alternately distributes the braking force to the wheels 91 to 94. In the case of executing step S10, the distribution of the braking force in step S40 is read as the redistribution of the braking force. The braking force controller 40 distributes the braking force to each wheels 91 to 94 so that the following distribution conditions 1, 2 are satisfied. The distribution conditions 1, 2 may be also applied in step S10.

The distribution condition 1 is a condition in which a sum of the braking forces generated at the wheels 91 to 94 is equal to or greater than the required braking force of the vehicle. This is an essential condition for braking the vehicle 900 as required.

The distribution condition 2 is a condition in which a deviation between a sum of the braking forces of the left wheels 91, 93 (FL, RL.) in the front and rear rows and a sum of the braking forces of the right wheels 92, 94 (FR, RR) in the front and rear rows is within a predetermined range. By setting the deviation of the braking forces of the left and right wheels to be equal to or less than an upper limit value, for example, a vehicle deflection due to generation of a yaw moment at the time of straight-ahead braking can be suppressed. However, a situation in which the deviation of the braking force is 0 is not always optimal. A condition may be set such that the deviation of the braking forces is equal to or greater than a lower limit value and equal to or less than the upper limit value when a difference between the braking forces of the left and right wheels is required to intentionally provide.

Figure 6:
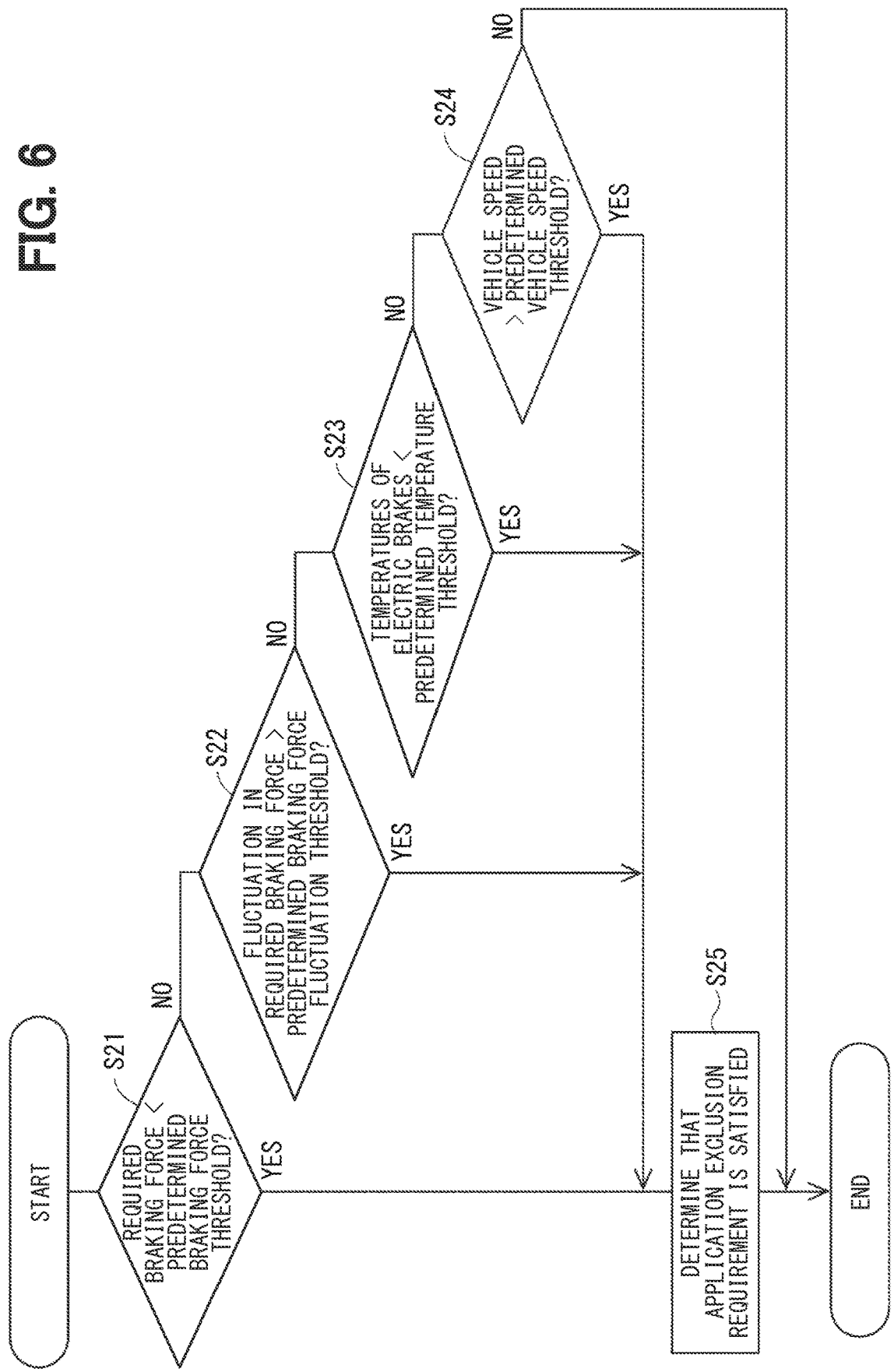
FIG. 6 is a flowchart of determination of whether an application exclusion requirement is satisfied.

An example of whether the application exclusion requirement is satisfied will be described with reference to the flowchart of FIG. 6. In this example, whether the application exclusion requirement is satisfied is sequentially determined in steps S21 to S24. It is determined that the application exclusion requirement is satisfied in step S25 when it is determined as YES in at least one of steps S21 to S24.

In step S21, it is determined whether a required braking force is less than a predetermined braking force threshold. Since a merit of reducing the electric current is small in a low current region, the braking force may be distributed at an appropriate ratio without providing the braking force holding wheel. In addition, before a sudden braking is determined in next step S22, a maximum electric current flow without using the braking force holding section in the low current region, so that an occurrence of a response delay can easily be avoided until the sudden braking is determined.

In step S22, it is determined whether fluctuation in the required braking force is greater than a predetermined braking force fluctuation threshold. In a case of YES in step S22, that is, in a case of the sudden braking, a response speed is prioritized over the electric current reduction. Therefore, the braking force holding wheel may not be provided and be used all the wheels 91 to 94 as the positive efficiency braking wheels.

In step S23, it is determined whether the temperatures Temp1 to Temp4 of the electric brakes 61 to 64 are less than a predetermined temperature threshold. If YES in step S23, a merit of reducing the electric current is small. In step S24, it is determined whether a vehicle speed is higher than a predetermined vehicle speed threshold. In the case of YES in step S24, since priority is given to the response speed as in a case of the sudden braking, all the wheels 91 to 94 may be set to the positive efficiency braking wheels without using the braking force holding wheels.

Next, with reference to FIG. 7, a change of the braking force in the vehicle due to the braking force alternate distribution processing will be described. As indicated by a wave-like broken line, the required braking force of the vehicle changes in such a manner that [I] increases or holds, [II] decreases, [III] increases and holds, and [IV] decreases. The braking force controller 40 alternately switches between the positive efficiency braking wheel and the braking force holding wheel during [I] and [III] when the required braking force of the vehicle is increased or held. At this time, the electric brakes 61 to 64 operate alternately in the braking force increase section A and the braking force holding section B of FIG. 2. While the required braking force of the vehicle decreases [II] and [IV], the braking force controller 40 operates in the braking force decrease section C of FIG. 2.

Figure 7:
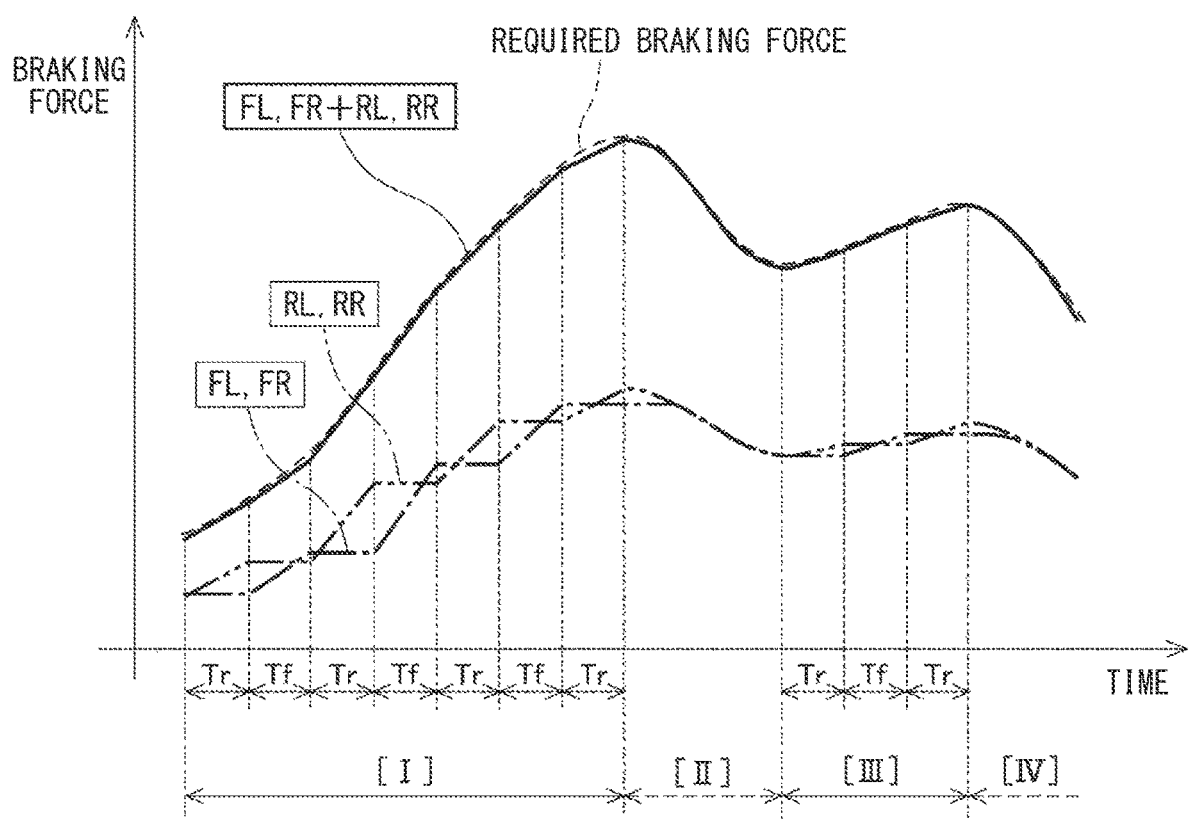
FIG. 7 is a diagram illustrating a change in braking force of the vehicle due to the alternate distribution process of the braking force.

A dash-dot-dash line in FIG. 7 indicates a change in the braking force caused by the left and right wheels FL, FR in the front row, and a two-dot chain line indicates a change in the braking force caused by the left and right wheels RL, RR in the rear row. A solid line in FIG. 7 indicates a total braking force indicated by the dash-dot-dash line and the two-dot chain line, that is, the change in an actual braking force of the vehicle. The actual braking force follows the required braking force to substantially match the required braking force. In the present embodiment, since the electric brakes 61 to 64 operate in the braking force holding section at timings shifted from each other, the electric current of the electric brake can be reduced while keeping the change of the braking force smooth in the vehicle. Therefore, a good brake feeling is realized. In addition, the electric current can be reduced even under a condition in which it is difficult to apply the conventional technique.

In FIG. 7, since an example in which the braking force is linearly increased in each of the force increasing periods Tf, Tr is simply illustrated, there is a portion where the solid line and the broken line are slightly shifted from each other. However, by shortening a time interval between the force increasing periods T, Tr or increasing the braking force to perform curve fitting with respect to the required braking force, the actual braking force can be accurately matched with the required braking force and a smoother change in the braking force can be realized.

Second Embodiment and Third Embodiment

Figure 8:
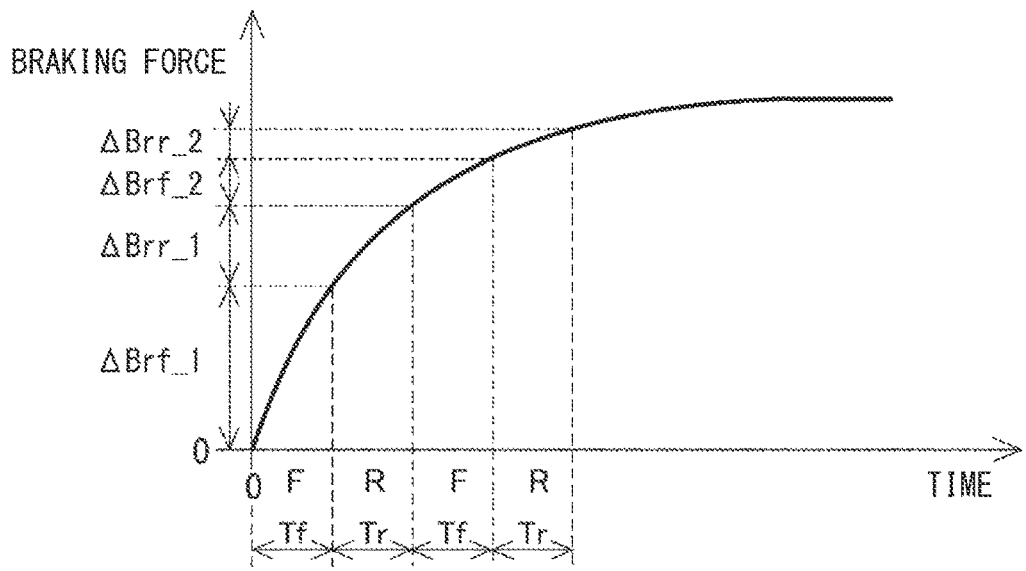
FIG. 8 is a time chart illustrating an alternate distribution process of the braking force according to a second embodiment.
Figure 9:
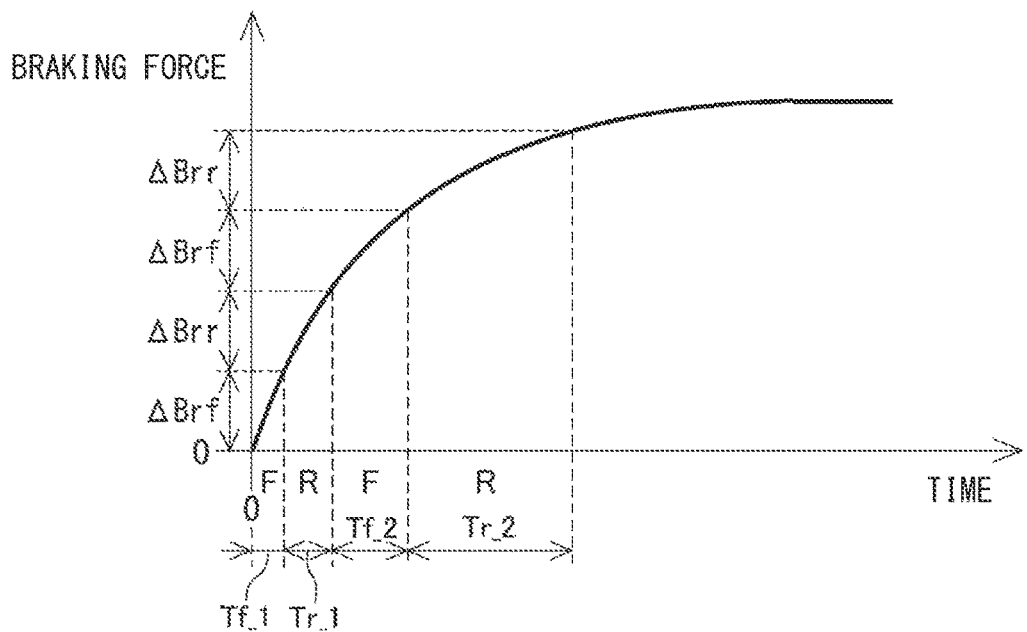
FIG. 9 is a time chart illustrating an alternate distribution process of the braking force according to a third embodiment.

FIGS. 3 and 4 of the first embodiment show a simple model in which the braking force changes linearly with time, whereas FIGS. 8 and 9 show a model in which the braking force changes non-linearly with time. Next, a process of alternately switching between the positive efficiency braking wheel and the braking force holding wheel will be described with reference to FIGS. 8 and 9. A method of illustration in FIGS. 8 and 9 is the same as in of FIGS. 3 and 4.

In the second embodiment illustrated in FIG. 8, a front row force increasing period Tf and a rear row force increasing period Tr are constant, and a switching cycle of the braking force distribution is fixed. Braking force change widths $\Delta Brf\_1$, $\Delta Brr\_1$, $\Delta Brf\_2$, $\Delta Brr\_2$ in each of the force increasing periods Tf, Tr are different from each other. Characters "_1" are a value in a first cycle after a start of processing, and characters "_2" are a value in a second cycle after the start of processing.

As described above, the braking force controller 40 of the second embodiment alternately switches between the positive efficiency braking wheels and the braking force holding wheels at the fixed cycle. In this method, since the braking force holding wheel corresponding to the time axis is determined in advance, control is relatively easy.

In the third embodiment shown in FIG. 9, the positive efficiency braking wheel and the braking force holding wheel are switched based on the braking force change widths $\Delta Brf$, $\Delta Brr$ in the respective force increasing periods, for example, when the braking force change widths $\Delta Brf$ and $\Delta Brr$ in the respective force increasing periods reach predetermined values. The predetermined values for the braking force change widths $\Delta Brf$, $\Delta Brr$ of the front row and the rear row may be set to different values. The respective force increasing periods $Tf\_1$, $Tr\_1$, $Tf\_2$, $Tr\_2$ are different.

As described above, the braking force controller 40 of the third embodiment alternately switches between the positive efficiency braking wheel and the braking force holding wheel based on the braking force change widths. In this method, since the braking wheels are switched based on the change in the actual braking force, a braking force balance of the vehicle is secured.

Fourth Embodiment

Next, a braking force alternate distribution processing according to a fourth embodiment will be described with reference to FIGS. 1 and 10. A braking force controller 40 of the fourth embodiment alternately switches between positive efficiency braking wheels and braking force holding wheels based on integrated power values $\Sigma P1$ to $\Sigma P4$ or temperatures Temp1 to Temp4 of each of the electric brakes 61 to 64. From a viewpoint of heat resistance protection of energization system components of the electric brakes 61 to 64, it is required to reduce the energization current and reduce heat generation as the integrated power values $\Sigma P$ and the temperatures Temp of the electric brake become higher.

Figure 10:
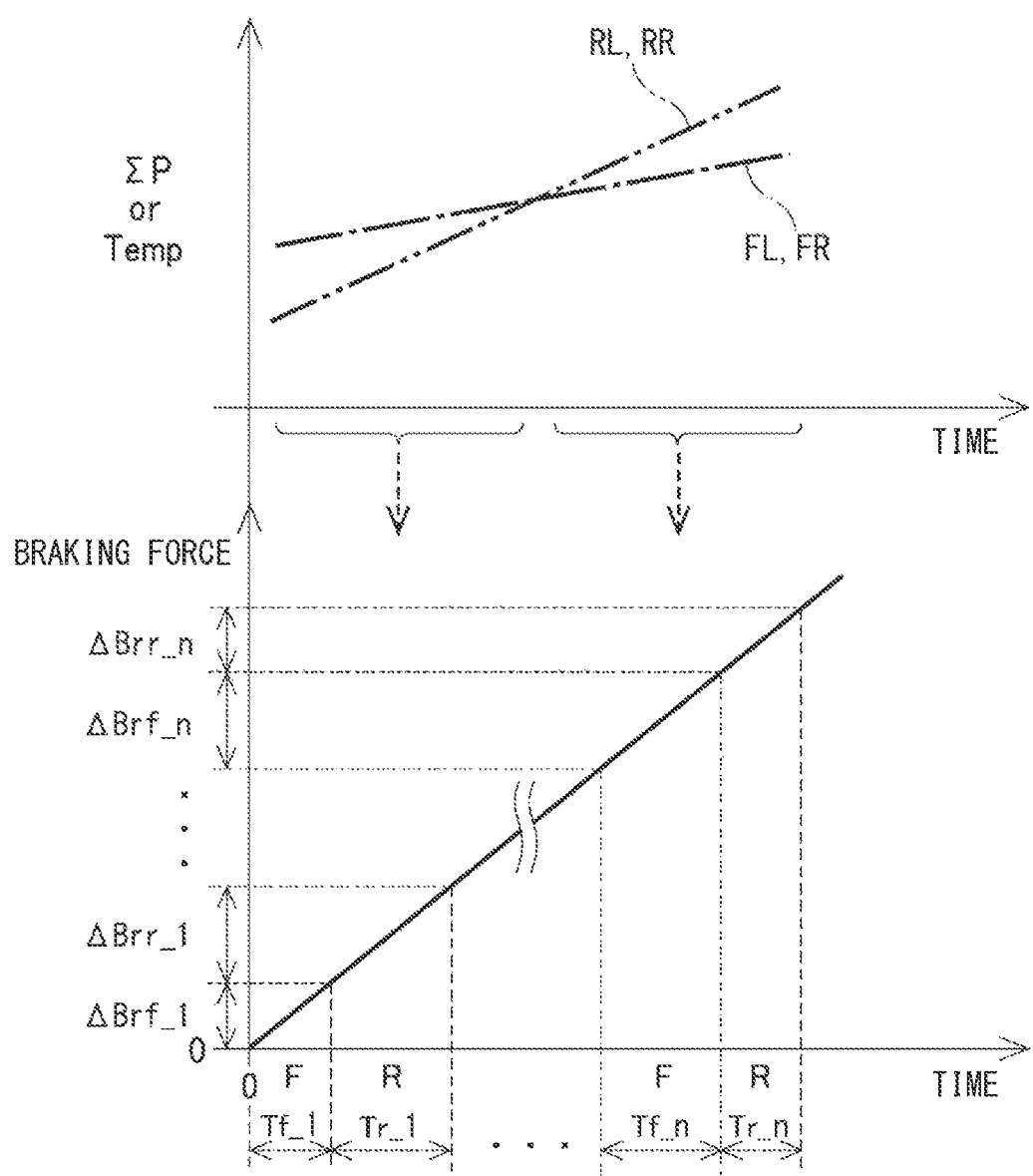
FIG. 10 is a time chart illustrating an alternate distribution process of the braking force according to a fourth embodiment.

An example of changes in the integrated power value or the temperature of each electric brake is shown in an upper part of FIG. 10. Hereinafter, "a change in the integrated power value" will be described as a representative example, but can be interpreted as "a change in the temperature" as appropriate. In a lower part of FIG. 10, the braking force alternate distribution processing according to the upper part of FIG. 10 is shown using the same description method as in FIG. 3.

In this example, in an initial stage of braking, the integrated power values $\Sigma P1$, $\Sigma P2$ of the electric brakes 61, 62 corresponding to the front row left and right wheels FL, FR are higher than the integrated power values $\Sigma P3$, $\Sigma P4$ of the electric brakes 63, 64 corresponding to the rear row left and right wheels RL, RR. However, the magnitude relationship is reversed during braking, and the integrated power values $\Sigma P3$, $\Sigma P4$ of the electric brakes 63, 64 corresponding to the rear row left and right wheels RL, RR are higher than the integrated power values $\Sigma P1$, $\Sigma P2$ of the electric brakes 61, 62 corresponding to the front row left and right wheels FL, FR at an end of braking.

The braking force controller 40 sets a relatively short force increasing period corresponding to an electric brake having a relatively high integrated power value, and sets a relatively long force increasing period corresponding to an electric brake having a relatively low integrated power value. Therefore, the front row force increasing period $Tf\_1$ of the first cycle in the initial stage of braking is set to be shorter than the rear row force increasing period $Tr\_1$. The braking force change width $\Delta Brf\_1$ of the front row is smaller than the braking force change width $\Delta Brr\_1$ of the rear row. In addition, the front row force increasing period $Tf\_n$ of a n-th cycle in the end of the braking is set to be longer than the rear row force increasing period $Tr\_n$. The braking force change width $\Delta Brf\_n$ of the front row is larger than the braking force change width $\Delta Brr\_n$ of the rear row. Thus, the braking force alternate distribution processing can be performed while reducing heat generation of the electric brake having a relatively high integrated power value.

Other Embodiments

The vehicle on which the vehicle braking device of the present disclosure is mounted is not limited to a four-wheel vehicle having two rows of left and right wheels in the vehicle front-rear direction, and may be a vehicle having six or more wheels having three or more rows of wheels in the vehicle front-rear direction.

For example, order of switching is not limited to being fixed, and may be changed each time when the positive efficiency braking wheel and the braking force holding wheel are alternately switched in four wheels. For example, the braking force holding wheels may be arranged in order of "FL, FR, RL, RR" in a first round, and the braking force holding wheels may be arranged in order of "FR, FL, RR, RL" in a second round.

The application exclusion requirement may include, as a condition, a case where it is difficult to realize smoothing of a change in the braking force in the entire vehicle due to an influence of a road surface condition, weather, or the like. For example, when the vehicle is traveling on a road surface having a small friction coefficient such as a frozen road surface or when a strong tailwind is blowing, or conversely, when the vehicle is traveling on a road surface having many unevenness or when a strong headwind is blowing, the braking force control is hardly reflected in the actual vehicle behavior, and thus it may be determined that the application exclusion requirement is satisfied.

The present disclosure should not be limited to the embodiment described above. Various other embodiments may be implemented without departing from the scope of the present disclosure.

The braking force controller and method described in the present disclosure may be implemented by a special purpose computer which is configured with a memory and a processor programmed to execute one or more particular functions embodied in computer programs of the memory. Alternatively, the braking force controller described in the present disclosure and the method thereof may be realized by a dedicated computer configured as a processor with one or more dedicated hardware logic circuits. Alternatively, the braking force controller and method described in the present disclosure may be realized by one or more dedicated computer, which is configured as a combination of a processor and a memory, which are programmed to perform one or more functions, and a processor which is configured with one or more hardware logic circuits. A computer program may be stored in a computer-readable non-transitory tangible recording medium as an instruction executed by a computer.

The present disclosure has been made in accordance with the embodiments. However, the present disclosure is not limited to such embodiments and configurations. The present disclosure also encompasses various modifications and variations within the scope of equivalents. Furthermore, various combination and formation, and other combination and formation including one, more than one or less than one element may be made in the present disclosure.

While the present disclosure has been described with reference to embodiments thereof, it is to be understood that the disclosure is not limited to the embodiments and constructions. To the contrary, the present disclosure is intended to cover various modification and equivalent arrangements. In addition, while the various elements are shown in various combinations and configurations, which are exemplary, other combinations and configurations, including more, less or only a single element, are also within the spirit and scope of the present disclosure.

What is claimed is:

1. A vehicle braking device to be mounted on a vehicle having electric brakes for generating a braking force at corresponding wheels, the vehicle braking device comprising a braking force controller configured to control the braking force generated by each of the electric brakes, wherein a relationship between an electric current and the braking force in each of the electric brakes has a hysteresis characteristic, the hysteresis characteristic indicates that the braking force increases along a positive efficiency line when the electric current increases, the braking force is held constant when the electric current decreases from a turning value, at which the electric current changes from an increase to a decrease, to a holding threshold, and the braking force decreases along an inverse efficiency line when the electric current decreases from the holding threshold, a section in which the braking force is held constant when the electric current decreases from the turning value to the holding threshold is a braking force holding section, a wheel corresponding to each of the electric brakes in which the braking force increases along the positive efficiency line is a positive efficiency braking wheel, a wheel corresponding to each of the electric brakes operating in the braking force holding section is a braking force holding wheel, and the braking force controller is configured to alternately switch between the positive efficiency braking wheel and the braking force holding wheel while a required braking force of the vehicle increases or is held, except when the vehicle satisfies a predetermined application exclusion requirement.

2. The vehicle braking device according to claim 1, wherein
the braking force controller is configured to control energization of each of the electric brakes so that one or more wheels always serve as the positive efficiency braking wheel and one or more of other wheels always serve as the braking force holding wheel while the required braking force of the vehicle is increased or is held, except when the vehicle satisfies the predetermined application exclusion requirement.

3. The vehicle braking device according to claim 1, wherein
the braking force controller is configured to alternately switch the positive efficiency braking wheel and the braking force holding wheel at a fixed cycle.

4. The vehicle braking device according to claim 1, wherein
the braking force controller is configured to alternately switch between the positive efficiency braking wheel and the braking force holding wheel based on a change width of the braking force.

5. The vehicle braking device according to claim 1, wherein
the braking force controller is configured to alternately switch the positive efficiency braking wheel and the braking force holding wheel based on an integrated power value or a temperature of each of the electric brakes.

6. The vehicle braking device according to claim 3, wherein
a numerical value used by the braking force controller to determine switching between the positive efficiency braking wheel and the braking force holding wheel is set to a different value for each of the wheels.

7. The vehicle braking device according to claim 1, wherein the braking force controller is configured to distribute the braking force to each of the wheels such that a sum of braking forces generated at each of the wheels is equal to or greater than a required braking force of the vehicle.

8. The vehicle braking device according to claim 7, wherein
the braking force controller is configured to further distribute the braking force to each of the wheels such that a deviation between a sum of the braking forces of left wheels in front and rear rows and a sum of the braking forces of right wheels in the front and rear rows in a four-wheel vehicle is within a predetermined range.

9. The vehicle braking device according to claim 1, wherein
the braking force controller is configured to control energization of each of the electric brakes such that each of all the wheels is the positive efficiency braking wheel when at least one of application exclusion requirements is satisfied, and
the application exclusion requirements include:
   the required braking force of the vehicle is less than a predetermined braking force threshold;
   fluctuation in the required braking force of the vehicle is greater than a predetermined braking force fluctuation threshold;
   temperature of each of the electric brake is less than a predetermined temperature threshold, and
   a vehicle speed is greater than a predetermined vehicle speed threshold.

* * * * *